Nov. 18, 1930.   J. W. HARDING   1,782,266

CLAMP AND METHOD OF MAKING THE SAME

Filed Nov. 8. 1929

John W. Harding
Inventor

By C A Snow & Co.
Attorneys.

Patented Nov. 18, 1930

1,782,266

UNITED STATES PATENT OFFICE

JOHN WALLACE HARDING, OF WHEELING, WEST VIRGINIA

CLAMP AND METHOD OF MAKING THE SAME

Application filed November 8, 1929. Serial No. 405,727.

This invention relates to a clamp and also to a method of making the same, one of the objects being to provide a clamp which can be cheaply and quickly constructed and constitutes an efficient means for gripping a post, strut or the like for the purpose of connecting guy wires and other bracing means, etc., to the engaged structure.

Another object is to simplify the method of producing the clamps whereby opposed eyes forming a part of the clamp and designed for the reception of a clamping bolt, will accurately aline so as to permit ready insertion of the bolt.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing.

In carrying out the invention there is provided a strip of metal indicated at 1 and in each end of this strip there is formed a short slot 2 terminating in a rounded enlargement 3. In addition to the strip 1 there is also provided a length of metal tubing designated at 4 and the middle portion of this tubing is formed with an annular concave portion 5.

Figure 1:
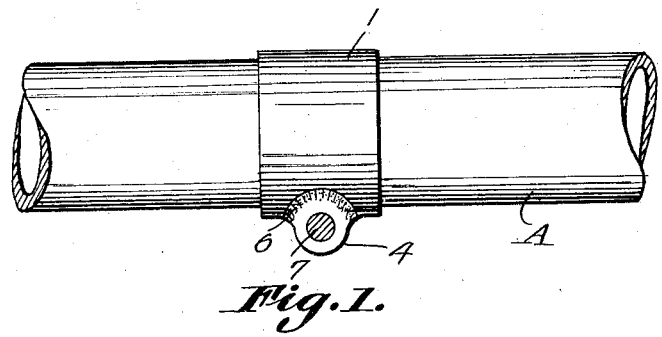
Figure 1 is a side elevation of the clamp, the same being shown in position on a tubular structure, the tie bolt being shown in section.
Figure 2:
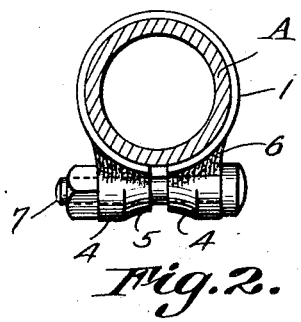
Figure 2 is an end view of the clamp, the tubular structure engaged thereby being shown in section.
Figure 3:
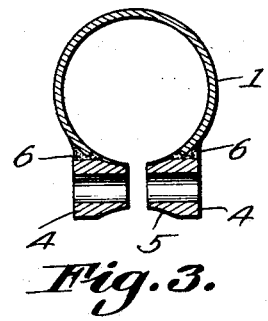
Figure 3 is a central transverse section through the clamp, the bolt being removed.
Figure 4:
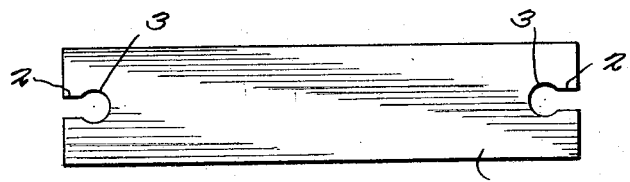
Figure 4 is a detail view of the blank from which the band portion of the clamp is formed.
Figure 5:
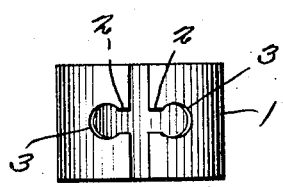
Figure 5 is a front view of the blank after it has been bent preparatory to the completion of the clamp.
Figure 6:
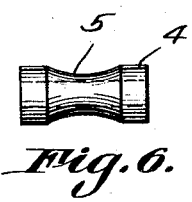
Figure 6 is a detail view of a tubular eye member used in the manufacture of the clamp.
Figure 7:
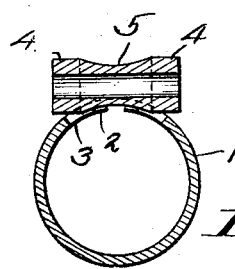
Figure 7 is a section showing the tubular eye member assembled with the band prior to being joined thereto.

Band 1 is bent to substantially circular form as shown in Figure 7 and the tubular eye member 4 is then laid on the ends of the band so as to rest within the slots 2 and their enlarged portions 3. When thus located the concave portion 5 of the tubular eye member will be substantially concentric with the center about which the band is bent. With the parts thus assembled the parts can be joined by welding, it being preferred to apply metal between the ends of the tubular member and the band as shown at 6 and fuse this metal so as to join the parts. Following the welding operation, a transverse cut can be made through the tubular member by means of a saw or other tool so that the end portions of said member will be separated to form eyes, one eye being carried by each end portion of the band.

The eyes, when assembled with the band in the manner described, will always be properly alined so that no difficulty will be experienced in inserting a clamping or tie bolt 7 through the eyes when it is desired to bind the clamp about a post, strut, or other structure indicated generally at A.

What is claimed is:

The herein described method of producing metal clamps which consists in slotting the ends of a metal band and bending the band to bring the ends adjacent to each other, thereafter applying to the slotted portions of the band a tubular member bridging the space between the ends of the band, subsequently joining the tubular member to the ends of the band by fusing, and finally dividing the tubular member at its center to form alining eyes.

In testimony that I claim the foregoing as my own, I have hereto affixed my signature.

JOHN WALLACE HARDING.